Patented May 27, 1930

1,760,535

UNITED STATES PATENT OFFICE

WILLIAM C. ARSEM, OF SCHENECTADY, NEW YORK, ASSIGNOR TO GENERAL ELECTRIC COMPANY, A CORPORATION OF NEW YORK

PROCESS OF TREATING OILS AND OTHER GLYCERIDES

No Drawing.   Application filed May 22, 1929. Serial No. 365,241.

The present invention is an improvement in the process of polymerizing organic glycerides containing an unsaturated fatty acid. It is one of the principal objects of my invention to reduce the time required for the conversion of such compounds to a desired condition.

Glycerides containing an unsaturated fatty acid include the drying oils, of which linseed oil, China wood oil, perilla oil, and soya bean oil, are well known members, also semi-drying oils, such as, for example, cotton seed oil. When such oils are subjected to heating they become polymerized, and very viscous. At a certain point in the heating they reach a desired state of viscosity, in which state the oil is known and used commercially as "bodied oil." Such oil is useful in paints, varnishes and other compounds requiring a heavy bodied oil. Ordinarily, such a "bodied," or "boiled" oil, as it is sometimes called, is prepared by heating the raw oil and such heating requires a comparatively long time in order to bring about the desired viscosity in the oil. For example, a batch of 1100 lbs. of raw linseed oil was subjected to heating in the usual way in order to prepare the bodied oil, and it was very slow in approaching the required viscosity. At the end of forty-four hours of heating the oil was even then a little too thin for use. It is thus seen that the time required to convert the raw oil to the desired viscosity is very long, and that the heat treatment is hence very expensive.

I have discovered that the conversion of drying oil to the desired viscosity, namely, the "bodied" stage, can be materially accelerated by the presence of an aromatic or aliphatic amine, preferably, benzidine.

In carrying out my invention I may, for example, add about one per cent by weight of a body having an amine group, to the raw oil, and then heat the oil in the usual way to cause it to become polymerized. The following substances containing an amine radical may be used in carrying out my invention: benzidine, para toluidine, diphenyl-amine, para-phenylene diamine, meta-phenylene diamine, di-isopropylamine.

The raw oil may be converted to a desired state, that is, as "bodied" oil, by the practice of my invention, in less than one-third of the time formerly required in the absence of an accelerator. For example, a batch of 1100 lbs. of the same raw linseed oil is used in the example above cited was converted to the desired state so that it possessed the required viscosity in 11¼ hours with the use of 1 per cent of benzidine.

It will thus be seen that with my invention there is a decrease in the time and cost of preparing heavy bodied oil for varnishes, paints and other compounds. It will also be noted that the polymerization of mixtures of oils such as linseed and China-wood oil, linseed and soya bean oil, to produce bodied oils having great resistance to moisture, may be materially hastened by the use of an amine body as a catalyst, and that such mixtures may be prepared at a lower cost than has heretofore been the case.

What I claim as new and desire to secure by Letters Patent of the United States is:—

1. The process of treating a glyceride of an unsaturated fatty acid, which consists in heating said glyceride in the presence of a substance containing an amine radical.

2. The process of treating a drying oil, which consists in heating said oil admixed with benzidine.

3. The process of treating a drying oil, which consists in mixing about 1% by weight of benzidine with said oil, and thereupon heating the same to effect a desired chemical change.

4. The process of treating a drying oil, which consists in heating said oil in the presence of about 1% by weight of an organic amine until said oil has been converted to the desired "bodied" state.

5. The process of accelerating the polymerization of a drying oil to the desired state, which consists in heating said oil with about 1% by weight of an organic amine.

In witness whereof, I have hereunto set my hand this 21st day of May, 1929.

WILLIAM C. ARSEM.